UNITED STATES PATENT OFFICE.

CYRUS WAKEFIELD, OF SOUTH READING, MASSACHUSETTS.

IMPROVEMENT IN THE UTILIZATION OF RATTAN WASTE.

Specification forming part of Letters Patent No. 44,242, dated September 13, 1864.

*To all whom it may concern:*

Be it known that I, CYRUS WAKEFIELD, of South Reading, in the county of Middlesex and State of Massachusetts, have made a new and useful invention, being a new manufacture, and having for its object the utilization of the waste product in the manufacture of chair-seating and like purposes from rattan; and I hereby declare the following to be a full, clear, and exact description of the same.

In order that my invention may be fully understood and appreciated, I deem it necessary briefly to refer to the manufacture of rattan, as heretofore carried on.

The rattan is received at the establishment where it is worked for the purposes used in the arts in as long reeds as possible and tied together in bundles of convenient size for transportation. These bundles are opened and the reeds properly gaged and assorted according to thickness or diameter. Those of equal diameter are gathered and separated from those of a different diameter or thickness. The reeds, which are generally bent in their middles, or thereabout, are then straightened by drawing them over a grooved roller in a direction opposite to the bend. When straight the reed or rattan is passed through a knotting-machine consisting of concentrically-arranged scrapers the edges of which press the periphery of the rattan with a yielding pressure. The rattan first engaged in between the scrapers is then seized by rollers driven by machinery or by the hand of the attendant and drawn through the scraping-machine, and the rattan issues therefrom with all the knots removed. The next operation is the washing of the rattan. This is effected in revolving drums which receive a constant supply of fresh water. When the rattan is clean and dried it is carried to the stranding-machine, where the strands of which the chair-seating is composed are cut in the manner as follows: The rattan is fed by means of rollers to and against a tubular cutter, with which are combined equidistant cutters radiating from the periphery of the tubular cutter. The result of this operation is the cutting of the rattan into strands or long strips with the silicious glaze upon its outer surface and a core of an external diameter equal to the internal diameter of the tubular cutter. This core constitutes the first of the waste products in this manufacture. The strands issuing from the machine last referred to have ragged or serrated edges, and are often of varying thickness. To give them a uniform thickness and smooth edges they are passed through a shaving-machine—*i. e.*, a machine feeding the individual strands to and against cutters which remove the ragged edge and reduce the thickness to a uniform standard. The shavings constitute the second waste product in this manufacture. The finished strands, after having been duly assorted according to length and properly bleached in sulphurous vapors or otherwise, are then tied into buches of about one thousand feet, and are then ready to be sold and fit for use in the manufacture of chair-seatings and for other purposes known in the arts.

From the above it will be seen that in the manufacture of rattan there are two principal sources of waste—viz., the coring of the reed and the shavings of the strands. Heretofore but little use was made of these except for kindling the fires under the boilers; but in a large manufacture these waste products accumulate to such extent that they have to be removed from the premises at considerable cost. It occurred to me to utilize these waste products for various useful purposes, and I have successfully accomplished my object by establishing a branch to the manufacture of rattan, in which the cores and shavings are used up in the production of articles of general utility, such as baskets, ropes, matting, coarse wrappers for bagging, and other articles as substitutes for similar articles made of willow, hemp, jute, china-grass, manila, and cocoanut and other like fibrous matter.

To enable others to make and use my invention, I shall now proceed to describe the manner in which the same is or may be carried into effect.

I first assort the shavings according to length and fineness, the short and thin or fine shavings being used as a stuffing for mattresses or furniture. The fine shavings constitute, on account of their elasticity and flexibility, an excellent substitute for husk or other similar substances used for stuffing mattresses and furniture of cheaper order. The larger shavings are spun on an ordinary but powerful spinning-frame, in which the yarn is formed and the yarn twisted into strands. The rattan shaving or fiber is spun by attaching the end of the yarn formed by hand to a whirl in the spinning-frame, to which a rapid rotary motion is imparted, which twists and binds the ends of the fiber together. The thickness of the yarn is regulated by the quantity of fibers which the attendant supplies in a given time while receding from the whirl; also by the rapidity with which the whirl is turned. The yarn is next twisted or "laid" into strands, care being taken to form the twist of the strands in a direction opposite to that of the yarn, so that each of the two may counteract the tendency of the other to untwist. The twisting or "laying" is effected on a tackle-board pierced with as many holes as there are yarns to be twisted. Generally two or three winches are used for making strands for ropes or rope matting. The strands thus formed are laid or twisted together into rope. To this effect three (more or less) of them are hooked to a revolving hook in the tackle-board and placed in the groove of a top—i. e., a conical block of wood provided with longitudinal grooves, which keep the strands separate in such proportions thereof which are not yet formed into rope. When the rope is finished it is wound into coils or upon a reel, and is then ready for sale or is manufactured into various articles, such as door and car matting, &c.

Another mode of working the rattan fiber consists in forming first a yarn, as described, and gathering it on the reels of a braiding-machine. The latter is strongly built to resist the strain exerted upon its parts in their operation upon the stiff and coarse fiber. In the machines I employ I use three reels mounted on vertical spindles, to which motion, in an 8-shaped path, is imparted by means of suitable gearing. This motion produces a braided band or cord, which cannot untwist, and which may be made dense or light, according to the use the braid is intended for. With the braided band I produce matting of various forms and dimensions by laying in a frame made of the braided cord a row of parallel strips, the interstices of which are filled with the same cord twisted, undulating, or otherwise, and by securing the cording at the points where they meet with a twine or other strong thread. When thus made the mats are trimmed by means of scissors and pressed between plates; but the latter may be dispensed with.

Large mats, floor-cloth, and baling-cloth are made in the following manner: For plain weaving a common loom with two healds or single harness and shuttle is used, and both the warp and weft are composed of the yarn above described. The operation of such looms is too familiar to require description. For twilled cloth a loom with three or more healds is used, according to the number of yarns contained in the interval between two intersections of the warp and the weft. The cloth, as fast as it is made, is wound upon a reel in the loom in the manner as this is practiced in the weaving of other fabrics. The cloth thus produced is unfit to be used for the purposes intended, because of the inequalities which its surface presents. After numerous and costly experiments to give it the requisite smoothness I have succeeded in producing the desired result in the manner as follows: I use two pairs or sets of rollers of cast-iron sufficiently heavy or weighted to produce a pressure of fifty tons, more or less. The first pair or set are revolved at a lesser speed than the second set or pair, and the upper roller of the second set is revolved at a greater speed than the under roller of the same set. The cloth being introduced between the first set is seized by it and carried to the second set of rollers, which, revolving at a greater speed than the former, will exert a considerable strain on the cloth, and thus submit it to a powerful stretching action. By this means the fibers are slipped one upon another to a uniformity of thickness. While this stretching operation is going on there is another action performed by the upper roller of the second set. This, it was stated, revolved or is driven at higher velocities than the under roller, so that its surface is caused to slip and rub the surface of the cloth under fifty tons pressure, or thereabout, the effect of which is the smoothing of the surface of the cloth.

The cores of the rattan are used for the manufacture of baskets, and constitute a most excellent material, being much stronger, and in appearance quite as beautiful as the willow generally used. The baskets are made by hand or on pattern-disks mounted on a horizontal spindle, which the operator shifts as the work progresses.

Having thus fully described my invention and the manner in which the same is or may be carried into effect, I claim—

As a new manufacture, ropes, matting, baling-cloth, and baskets, made, in the manner substantially as described, from the waste products of the manufacture of chair-seating from rattan.

In testimony whereof I have signed my name to this specification before two subscribing witnesses.

CYRUS WAKEFIELD.

Witnesses:
JOHN W. ROSBORROW,
CYRUS WAKEFIELD, 2d.